United States Patent [19]

Yamada et al.

[11] Patent Number: 5,319,740
[45] Date of Patent: Jun. 7, 1994

[54] EXPERT SYSTEM BUILDING METHOD AND SYSTEM

[75] Inventors: Hiroshi Yamada, Kawasaki; Kenichi Nakarai; Katsuyuki Yoshino, both of Yokohama, all of Japan

[73] Assignee: Hitachi, Ltd., Tokyo, Japan

[21] Appl. No.: 664,205

[22] Filed: Mar. 4, 1991

[30] Foreign Application Priority Data

Mar. 9, 1990 [JP] Japan ................................. 2-56358

[51] Int. Cl.⁵ ............................................. G06F 7/28
[52] U.S. Cl. ............................................. 395/75; 395/76
[58] Field of Search ................................... 395/75, 76

[56] References Cited

U.S. PATENT DOCUMENTS

| | | | |
|---|---|---|---|
| 4,829,426 | 5/1989 | Burt | 364/300 |
| 4,866,634 | 9/1989 | Reboh et al. | 364/513 |
| 5,119,318 | 6/1992 | Paradies et al. | 395/61 |

OTHER PUBLICATIONS

1st-Class Tutorials and Knowledge Engineering Guide, 1st-Class Expert Systems, Inc., 1989, selected pp.

Ruth et al., 1st-Class Expert System Instruction Manual, Nov. 1989.

Fekete et al., "GENESE, Narrowing the Gap Between Experts and Systems," IEEE Engineering in Medicine & Biology Society 11th Annual Intl. Conf., Nov. 1989, 1845–1846.

Primary Examiner—Michael R. Fleming
Assistant Examiner—Robert W. Downs
Attorney, Agent, or Firm—Fay, Sharpe, Beall, Fagan, Minnich & McKee

[57] ABSTRACT

An expert system building method wherein, in an expert system which executes an inference process according to a decision tree, at least one data unit or any combination of such data units of data forming an input/output information is made. Next, a data input/output method is specified on the basis of relationship between the at least one data unit and the input/output information. Thus, data possibly needed can be stored simultaneously. The expert system can execute an inference process according to the decision tree having the expert's knowledge described as they are with no relation to the data input, and the data can be simultaneously entered in units which are easy to understand by an end user with no relation to the process of the decision tree.

12 Claims, 28 Drawing Sheets

FIG. 5

HOUSE

| DATA NAME "HAVE MUCH MONEY" | NODE "RENT HOUSE" | NODE "OWNED HOUSE" |
|---|---|---|
| YES | | O |
| NO | O | |

501

RENT HOUSE

| DATA NAME "THINK MUCH OF PRIVACY" | NODE "LIVING WITH PARENT(S)" | NODE "COMPANY OWNED HOUSE" |
|---|---|---|
| YES | | O |
| NO | O | |

502

OWNED HOUSE

| DATA NAME "WANT TO LIVE IN DOWNTOWN AREA" | NODE "MANSION" | NODE "DETACHED HOUSE" |
|---|---|---|
| YES | O | |
| NO | | O |

HOUSE  801

| DATA NAME<br>"HAVE MUCH MONEY" | DATA NAME<br>"HAVE OTHER EXPENSIVE PURCHASING" | NODE<br>"RENT HOUSE" | NODE<br>"OWNED HOUSE" |
|---|---|---|---|
| NO |  | ○ |  |
| YES | YES |  | ○ |
| YES | NO | ○ |  |

FIG. 9

OWNED HOUSE

| DATA NAME | DATA VALUE | SCORE |
|---|---|---|
| "NEED A GARDEN" | YES | 0 |
|  | NO | 2 |
| "PREFER DOWNTOWN AREA" | YES | 2 |
|  | NO | 1 |
| "WANT TO LIVE FOR THE REST OF THE LIFE" | YES | 0 |
|  | NO | 2 |

901

| SCORE | NODE "MANSION" | NODE "DETACHED HOUSE" |
|---|---|---|
| GREATER THAN OR EQUAL TO 4 | ○ |  |
| LESS THAN OR EQUAL TO 3 |  | ○ |

| INPUT DATA NAME | INPUT PANEL | BASE PANEL |
|---|---|---|
| HAVE MUCH MONEY | INPUT A | QUESTIONING SCREEN |
| HAVE OTHER EXPENSIVE PURCHASING | | |
| WANT TO LIVE FOR THE REST OF THE LIFE | | |
| THINK MUCH OF PRIVACY | | QUESTIONING SCREEN |
| NEED A GARDEN | | |
| PREFER DOWNTOWN AREA | INPUT B | |

FIG. 11

| OUTPUT DATA NAME | OUTPUT PANEL | BASE PANEL |
|---|---|---|
| LIVING WITH PARENT(S) | | CONCLUSIVE SCREEN |
| COMPANY OWNED HOUSE | | CONCLUSIVE SCREEN |
| MANSION | IMAGE OF MANSION | CONCLUSIVE SCREEN |
| DETACHED HOUSE | | |

FIG. 13
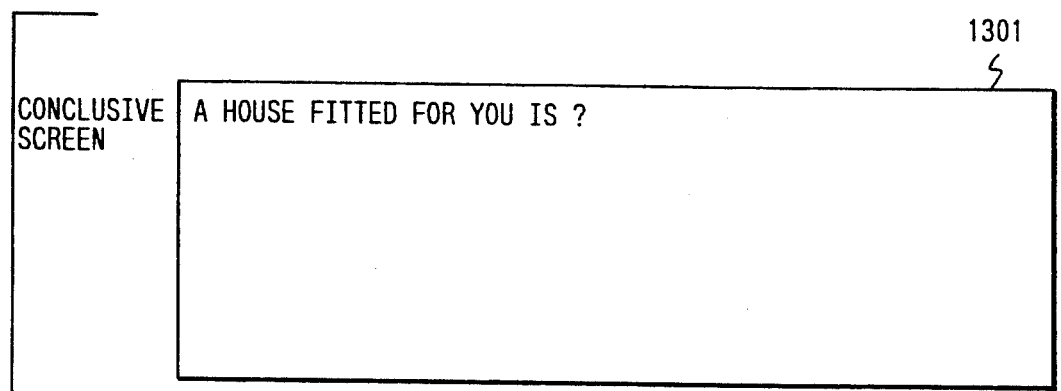
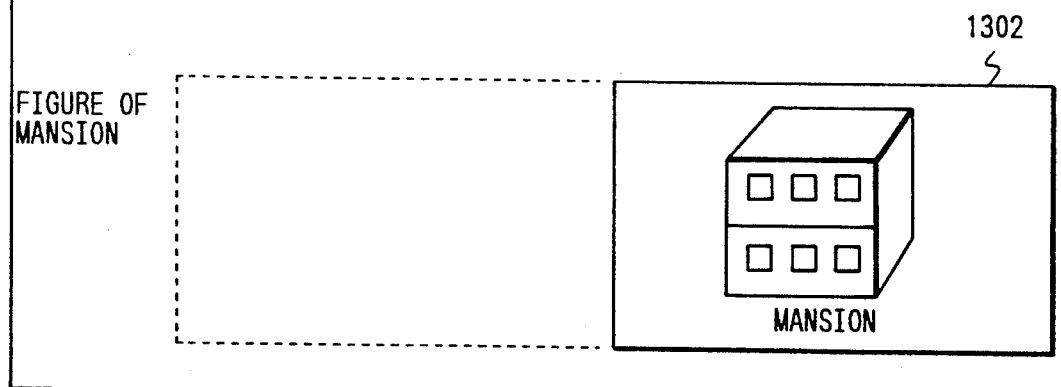

PLEASE ANSWER THE QUESTION

END

HAVE YOU MUCH MONEY ?

HAVE YOU OTHER EXPENSIVE PURCHASING ?

DO YOU WANT TO LIVE FOR THE REST OF YOUR LIFE ?

1402

PLEASE ANSWER THE QUESTION

FRONT    END

THINK MUCH OF PRIVACY

1403

A HOUSE FITTED FOR YOU IS ?

COMPANY OWNED HOUSE

EXPERT SYSTEM BUILDING METHOD AND SYSTEM

BACKGROUND OF THE INVENTION

1. Field of the Invention

The present invention relates to an expert system building method and system, and more particularly concerns an expert system building method and system suitable for an expert system used for diagnoses.

2. Description of the Prior Art

There have been many prior disclosures regarding systems for generating the expert systems with an input of a decision tree and its extension, for example, in articles entitled "Procedure Consultant", the Nikkei AI, No. 1988.6.20, and "KLUE", Nikkei AI, No. 1989.8.28. These systems have branches having used data written clearly in the course of the decision tree.

It is desirable for the data input in the expert system to enter the data in units that are easy to understand by end users. As an example, it can be considered that a conventional single card of data or data coherent in meaning such as body height and weight are entered at the same time.

On the other hand, the decision tree having expert's know-hows described as they are, is not always needed for branch judgement of data in units which are easy by understand to the end users. In prior systems, description of the expert's know-hows have priority to the other factors, having tile decision tree which is logic for inference and the data input integrated. The prior systems therefore could not always be built to allow the data to be entered in units that the end users could easily understand.

SUMMARY OF THE INVENTION

In view of the foregoing, it is a general object of the present invention to provide an expert system building method and system which allows data to be entered in a way easily understood by end users and allows an inference to be made according to the logic of inference having the expert's know-hows described therein as they are.

Briefly, the foregoing object is accomplished in accordance with aspects of the present invention by an expert system building method and system, characterized in specifying at least one data unit or any combination of such data units of data forming an input/output information and a data input/output method on the basis of relationship between the at least one data unit and the input/output information, and in which the data input/output means which can make at least either of the input or the output on the basis of the specification of the data input/output method. More specifically the expert system has data input/output means, storing means, and interpreting and executing means of a program. It also has means for storing a group of a plurality of data to be input at a time. The data input/out means can enter the specified plurality of data simultaneously. For the reason, according to the present invention, if data is needed in the course of processing on the decision tree, the predetermined plurality of data including that data are entered at a time. Thus, the expert system can make an inference according to the decision tree having the expert's know-hows described as they are with no relation to the data input, and the data can be simultaneously entered in units which are easy to understand for an end user with no relation to the process of the decision tree.

The foregoing and other objects, advantages, manner of operation and novel features of the present invention will be understood from the following detailed description when read in connection with the accompanying drawings.

BRIEF DESCRIPTION OF THE DRAWINGS

FIG. 5 are some decision tables for the nodes. FIG. 8 shows a decision table which is a decision table for the node. FIG. 9 shows a scoring table. FIG. 10 shows how to define the input data. FIG. 11 shows how to define the output data. FIGS. 12 and 13 show panels. FIG. 14 shows examples of the menu for operation.

DETAILED DESCRIPTION OF THE PREFERRED EMBODIMENTS

These and other objects and features of the present invention will be better understood upon consideration of the following detailed description and the accompanying drawings. The first subsection describes an expert system building tool, and the second subsection describes internal processes of the generated expert system. The third subsection describes a method for generating the expert system in terms of data input in the expert system building tool.

(1) An expert system building tool

Figure 2:
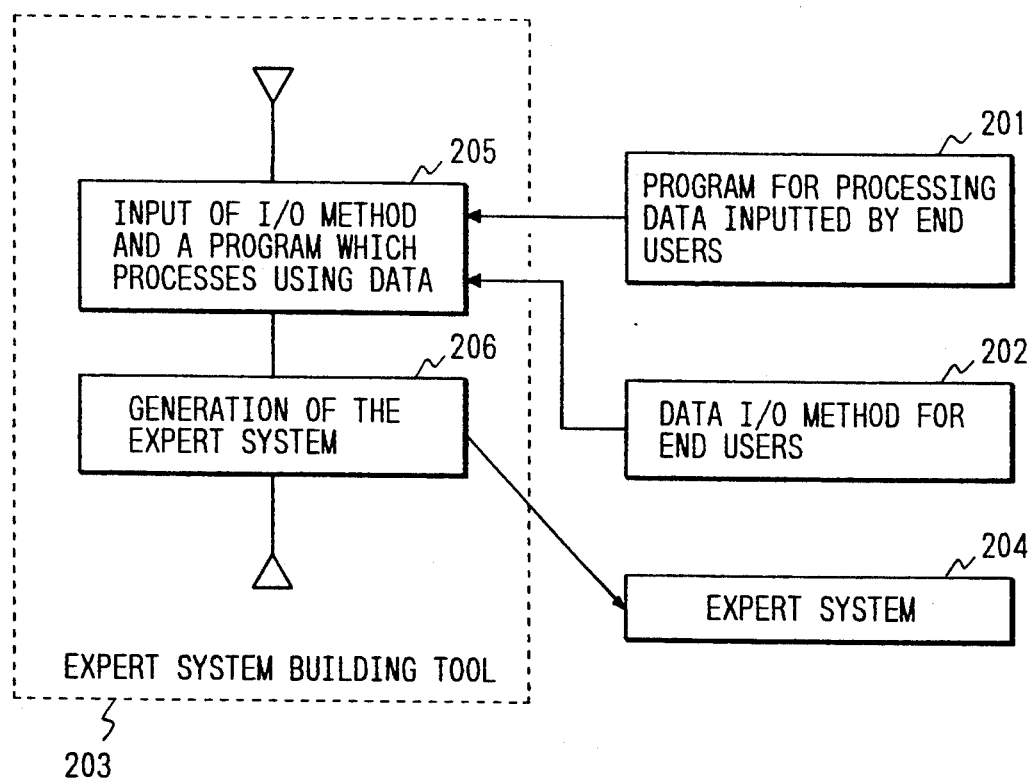
FIG. 2 is a block diagram showing an input and output process relationship of an expert system building tool.

FIG. 2 is a block diagram showing an input and output process relationship of an expert system building tool. The expert system building tool comprises a step 205 which can have two inputs of program 201 for processing data input by an end user and of method 202 for input and output of the data by the end user entered independently, and a step 206 that can generate an expert system 204.

Figure 3:
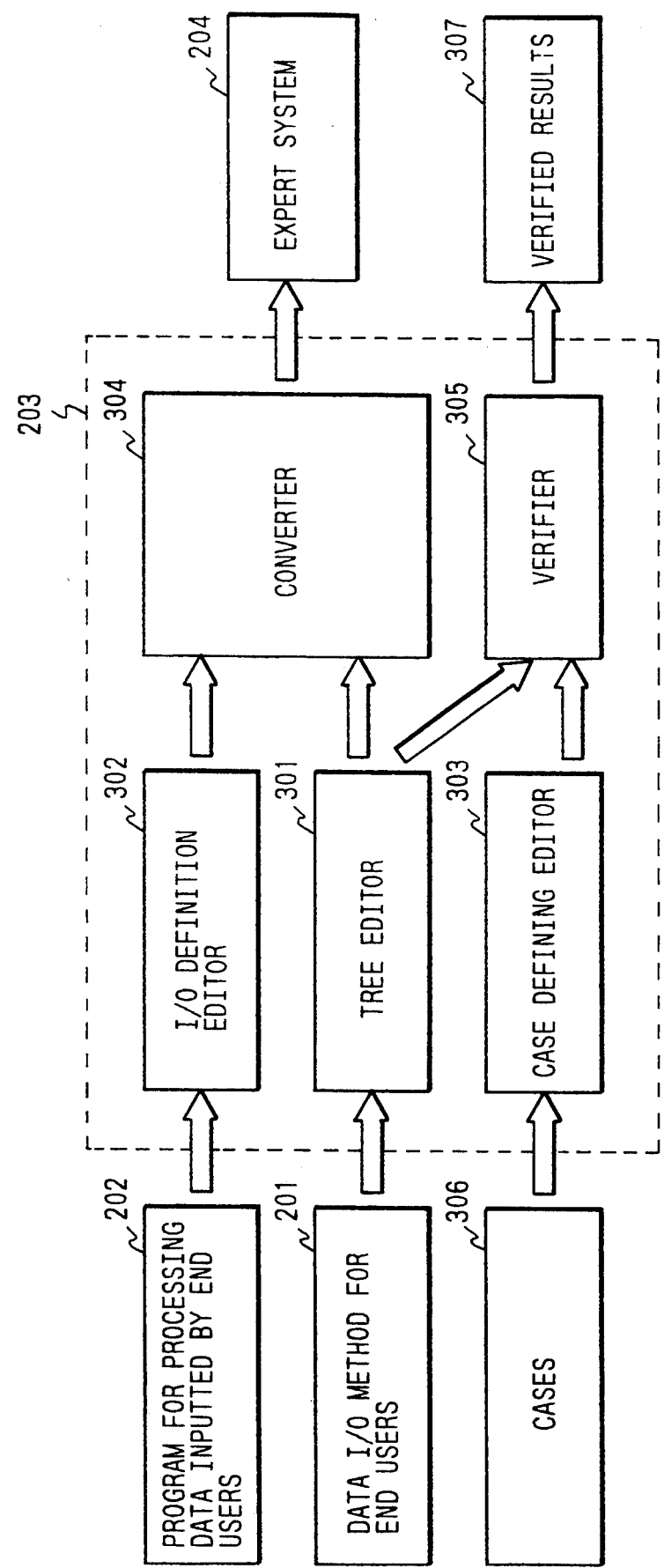
FIG. 3 is a block diagram illustrating the expert system building tool.

FIG. 3 is a block diagram illustrating the expert system building tool. The expert system building tool comprises a tree editor 301 for entering the program 201 which can process data entered by the end user. An I/O definition editor 302 for entering the data I/O method 202 for an end user, a converter 304 for generating the expert system 204 on the basis of the data entered by the tree editor 301 and the I/O definition editor 302, a case defining editor 303 for entering cases 306 made by a human expert, and a verifier 305 for verifying on the basis of the data entered by the tree editor 301 and the case defining editor 303 to feed out verified results 307.

The following describes an example of input to the expert system building tool and the expert system 204 generated at the time.

Figure 4:
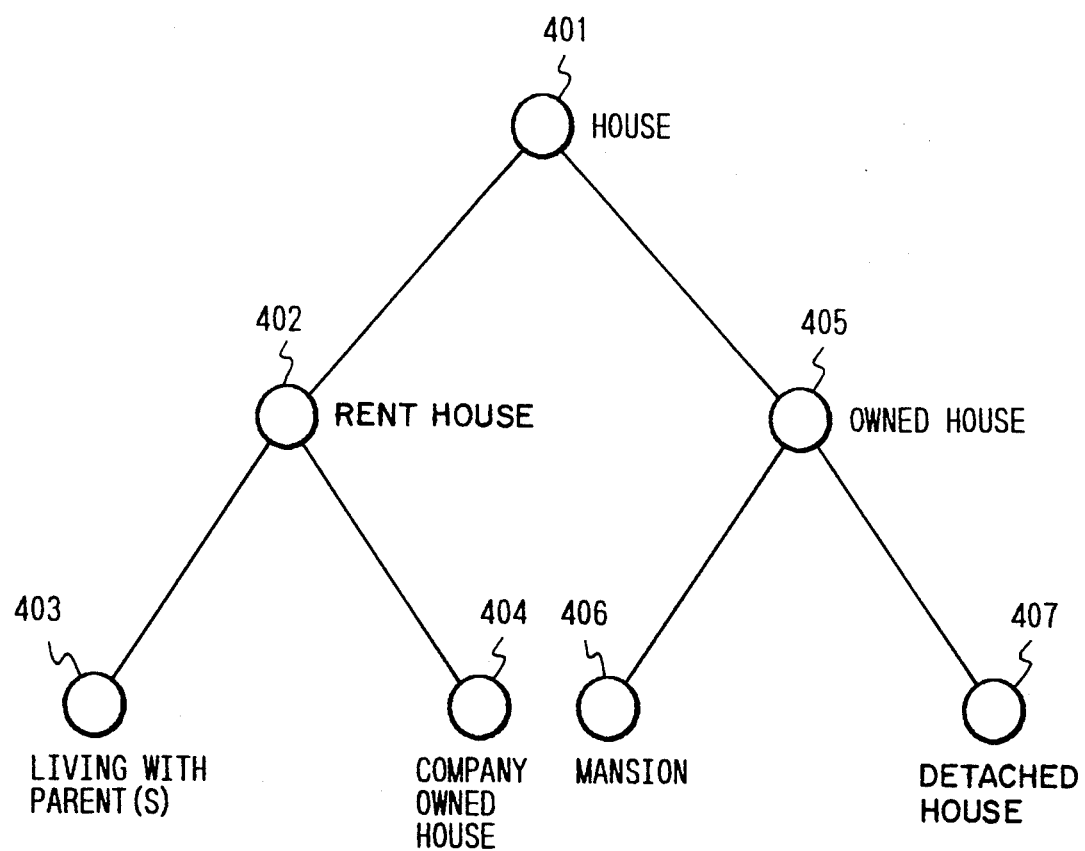
FIG. 4 is an example of the program for processing the data entered by the end user through the case defining editor.

FIG. 4 is an example of the program for processing the data entered by the end user through the case defining editor 303. In the example, the program is a decision tree to determine in which house a person will live. The decision tree comprises nodes 401 through 407. Each of the nodes is added with a decision table expressing to what a node it is to be branched next. Some decision tables are shown in FIG. 5. If a decision table corresponding to a node 'House' 401 is 501 and if the data name 'Have much money' is 'Yes', the node should be branched to a node 'Owned house'. If it is 'No', it is branched to a node 'Rent house' 402. Determination tables 502 and 503 are used to judge branches to a node 'Living with parent(s)' 403 or 'Company owned house' 404 and a node 'Mansion' 406 or 'Detached house' 407 depending on the respective data names 'Think much of privacy' and 'Want to live in downtown area'.

In the above mentioned example, the data I/O method 202 for the end user is not entered to the expert system building tool. In this case, the expert system building tool uses a default value as the data I/O method 202 for the end user.

Figure 6:
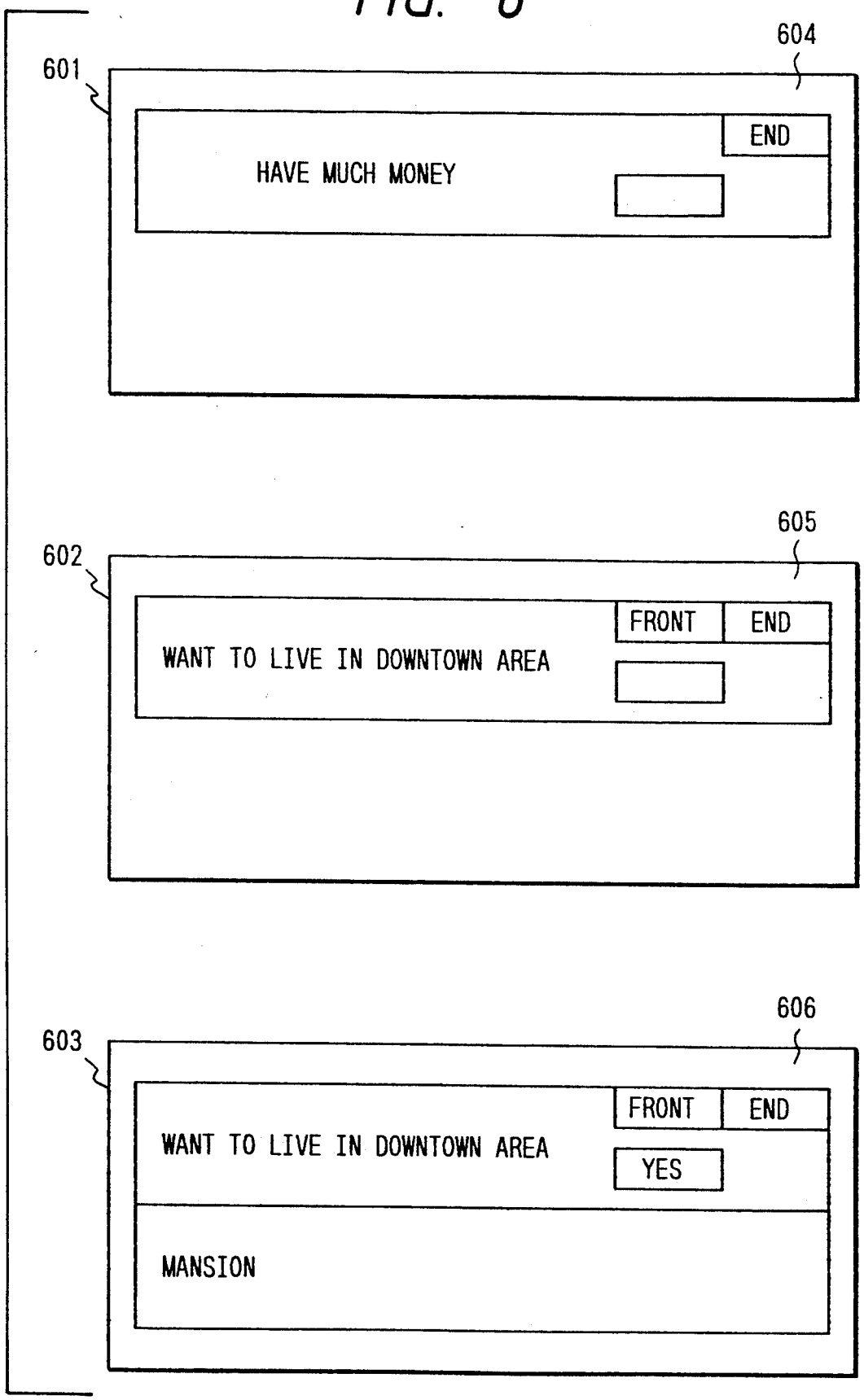
FIGS. 6 and 7 show examples of the menus for operation.

The following describes an example of operation of the expert system 204 generated by the converter 304 on the basis of the data entered as described above. With the system started, a process is started from the root node 'House' 401 of the decision tree, which makes an input menu appear for data needed then. FIG. 6 shows examples of the input menus. A menu 601 requests entering an answer to the data 'Have much money'. If the end user enters 'Yes', the process advances to the node 'Owned house' 405 according to the decision table 501 corresponding to the node 'House' 401. In turn, it makes another input menu appear for data needed for the decision table 503 corresponding to the node 405. The menu changes to a menu 602. This requests entering an answer to the data 'Want to live in downtown area'. If the end user enters 'Yes', the menu changes to a menu 603. It will display a conclusion that the mansion is adequate for the end user to live.

Figure 7:
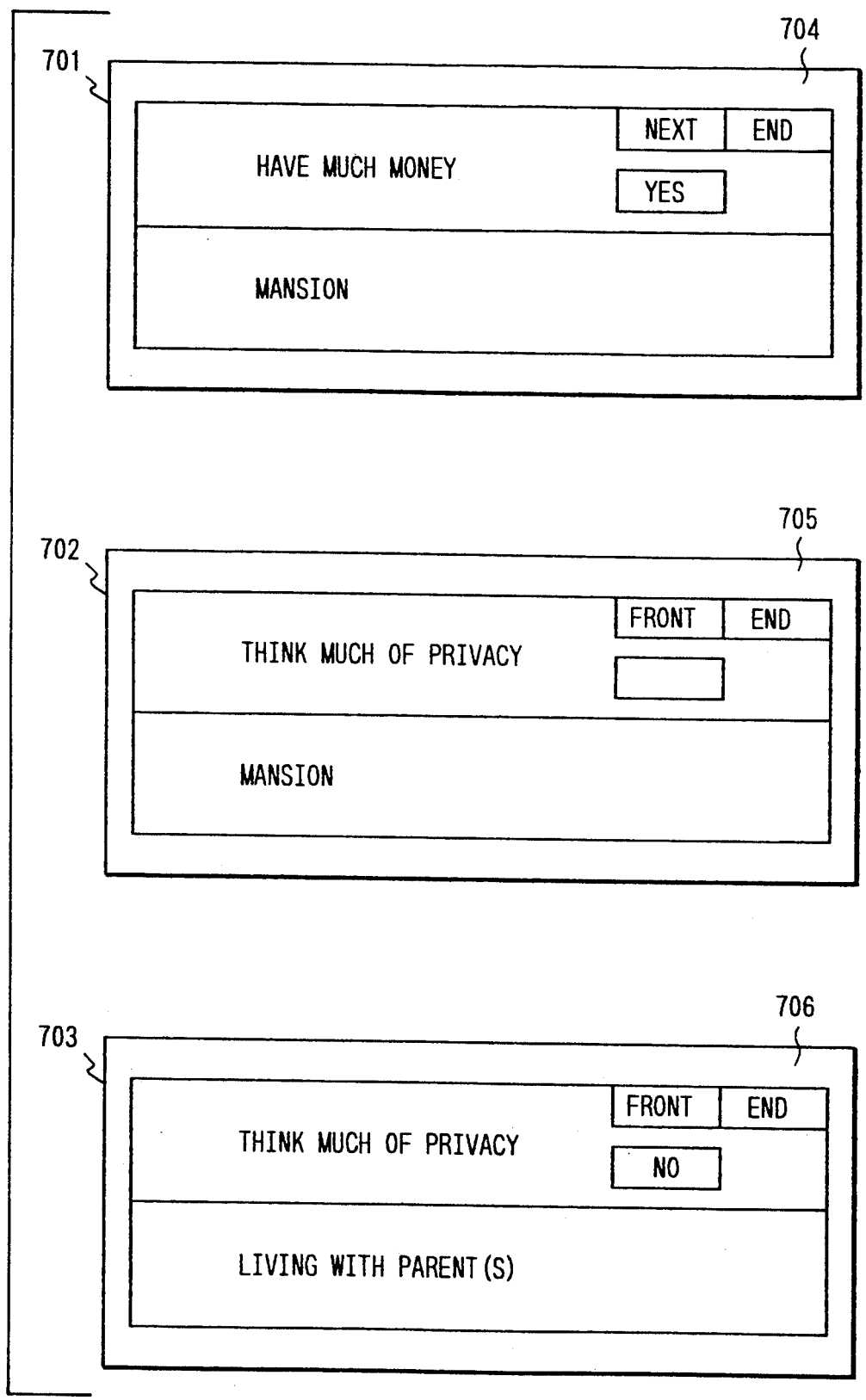

The following describes correction of the data entered once with reference to FIG. 7. If indication is made at 'Front' of an icon 606 of the menu 603, this is returned to the preceding menu 701. If the data 'Have much money' has the answer 'No', then the menu 702 is made to appear. The menu requests entering an answer to the data 'Think much of privacy'. If the end user enters 'No', a menu 703 appears. It will display a conclusion that the 'Living with parent(s)' is adequate for the end user. If entering the data is completed, the icons 604 to 606 and 704 to 706 should have 'End' entered to indicate it.

So far, the first example has described an expert system built with the the expert system building tool.

In turn, the following describes another example in which a more complicated knowledge expression and input and output definitions are made. Most contents of the program 201 for processing the data entered by the end user are the same as those of the preceding example. Different parts are described below. The decision table 501 for the node 401 in the preceding example used only one data for determining the branch, but that of the present example uses two data.

FIG. 8 shows a decision table 801 which is a decision table for the node 401. It expresses as follows. If the answer to the data 'Have much money' in the decision table 801 is 'No', it is branched to the node 'Rent house' 402 irrespective of the data 'Have other expensive purchasing'. If answer to the data 'Have much money' is 'Yes' and if the answer to the data 'Have other expensive purchasing' is 'No', it is branched to the node 'Owned house' 405. If the answer to the data 'Have much money' is 'Yes' and if the answer to the data 'Have other expensive purchasing' is 'Yes', it is branched to the node 'Rent house' 402.

In order to express the process in each node, a method other than the decision table can be used. In the example are shown a scoring table and a decision table for processing of the node 'Owned house' 405. FIG. 9 shows a scoring table 901 which is a scoring table corresponding to the node 'Owned house' 405. The scoring table relationship between data value and score is used for making a judgement. If the answer to the data 'Need a garden' is 'No', for example, the score of 2 is added. Scores of the three data are summed. The total score and a decision table 902 are used to judge a node to branch too. In the example, if the total score is four or more, the node 'Owned house' 405 is branched to the node 'Mansion' 406. If it is three or less, it is branched to the node 'Detached house' 407.

The decision table 902 is used for judgement of branching only with use of the scoring table 901. It can have the total score and additional new data used, for example, a data name 'Acrophobia'.

In turn, the following describes an example of the data I/0 method 202 for the end user. FIG. 10 shows how to define the input data. In the figure is shown an input data defining table 1001. It has a column of an input data name 1002 which has all input data written for use in the program 201 for processing data input by an end user, and is arranged of data to be entered by the end user at a time. The input data defining table 1001 also has an input panel 1003 indicating a menu to be used to enter the data and a base panel 1004 indicating a background menu at the time of entering. That is, if input data is needed in the course of inference, all the data given in the input data defining table 1001 are entered at a time. At that time, the menu specified on the input panel 1003 is superimposed on the menu specified on the base panel 1004. If no specification is made on the input panel 1003 and base panel 1004, then a standard menu is used.

The following describes an example of definition of output data with reference to FIG. 11. In the figure is shown an output data defining table 1101. It has an output data name 1102 which has output data specified as to be output at a node of the program 201 for processing data input by an end user. If no specification is made, setting is automatically made to leaves of the decision tree shown in FIG. 4, that is, to the node 'Living with parent(s)' 403, node 'Company owned house' 404, node 'Mansion' 406, and node 'Detached house' 407 The output data defining table 1101 also has an output panel 1103 indicating a menu to be used to output the data and a base panel 1104 indicating a background menu at the time of output. If inference is moved to a node specified with the output data fed out during the inference, the menu specified on the output panel 1103 is superimposed on the menu specified on the base panel 1104. If no specification is made on the output panel 1103 and base panel 1104, then a standard menu is used.

Figure 12:
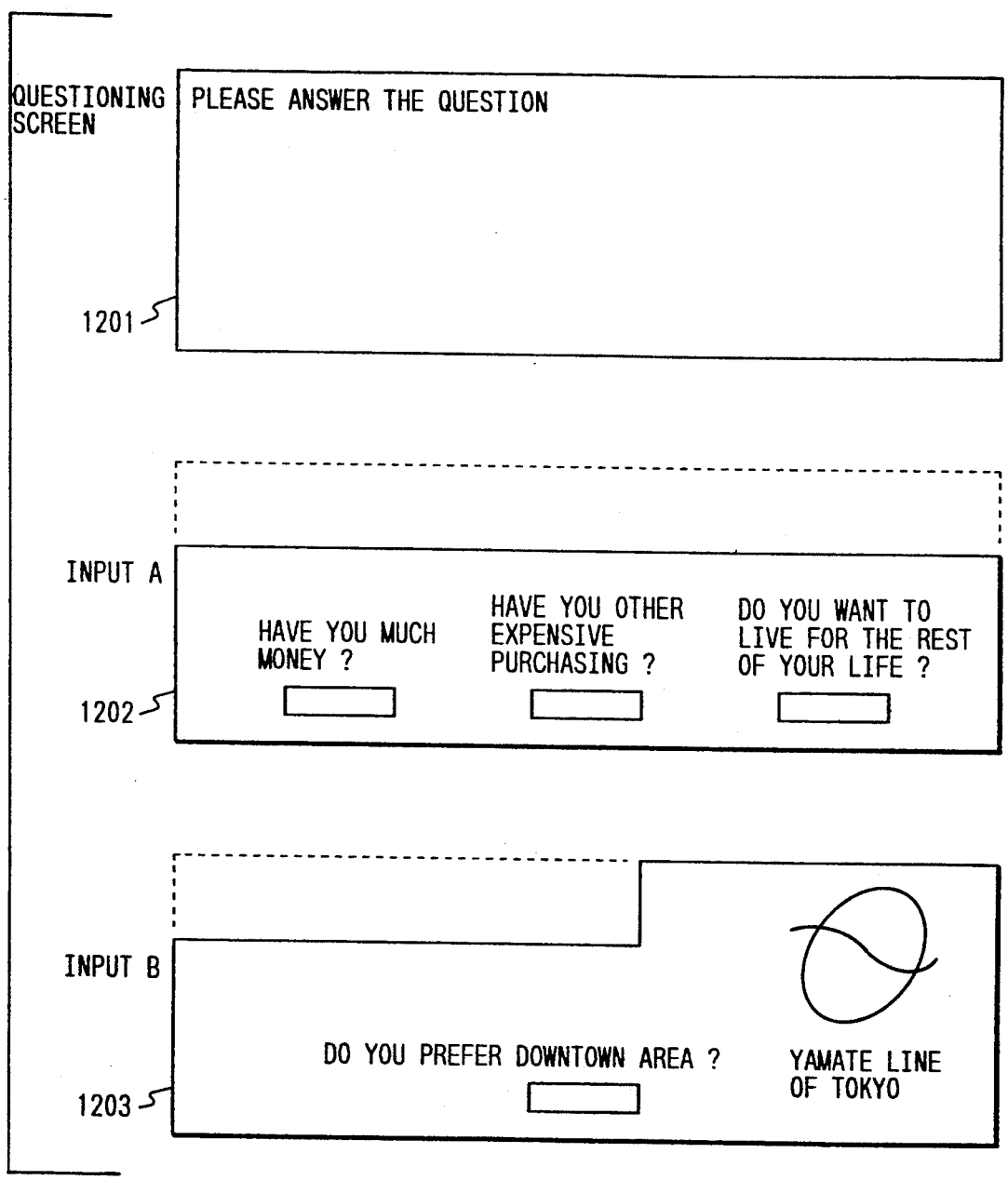

The following describes the input panel 1003 and the base panel 1004 specified on the input data defining table 1001 in FIG. 10 and the output panel 1103 and the base panel 1104 specified on the output data defining table 1101 in FIG. 11. FIG. 12 shows menus specified in FIG. 10. FIG. 13 shows menus specified in FIG. 11. In the figures are shown a questioning image 1201, an input A 1202, an input B 1203, a result image 1301, and figure of mansion 1302.

The following describes in FIGS. 8 and 9 additions and changes to FIGS. 4 and 5 and an example of operation of the expert system 204 generated by the converter 304 when the data shown in FIGS. 10 through 13 are entered. When the system is started, a process is started from the node 401 of the decision tree. An input menu for data needed is made to appear. FIG. 14 shows examples of the input menu. A menu 1401 requests answers to the data 'Have you much money?' and 'Have you other expensive purchasing?' An input A 1202 is superimposed on the questioning image 1201 according to the definition in the input data defining table 1001. If the end user enters 'No' to the data 'Have you much money?' and properly answers the other two questions, process moves to the node 'Rent house' 402 according to the decision table 801 corresponding to the node 401. An input menu for the data needed in the decision table 502 corresponding to the node 'Rent house' 402 is made to appear. The menu therefore becomes menu 1402. This requests an answer to the data 'Think much of privacy'. The standard menu is superimposed on the questioning image 1201 according to the definition in the input data defining table 1001. If the end user enters 'Yes' to the data 'Think much of privacy', process moves to the node 'Company owned house' 404 according to the decision table 502 corresponding to the node 'Rent house' 402. A menu 1403 then is made to appear. The standard menu is superimposed on the base panel 1104 according to the definition in the output data defining table 1101.

Figure 15:
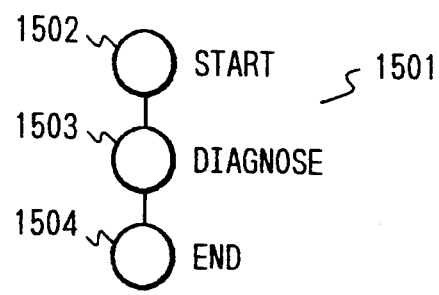
FIG. 15 shows a decision tree.
Figure 16:
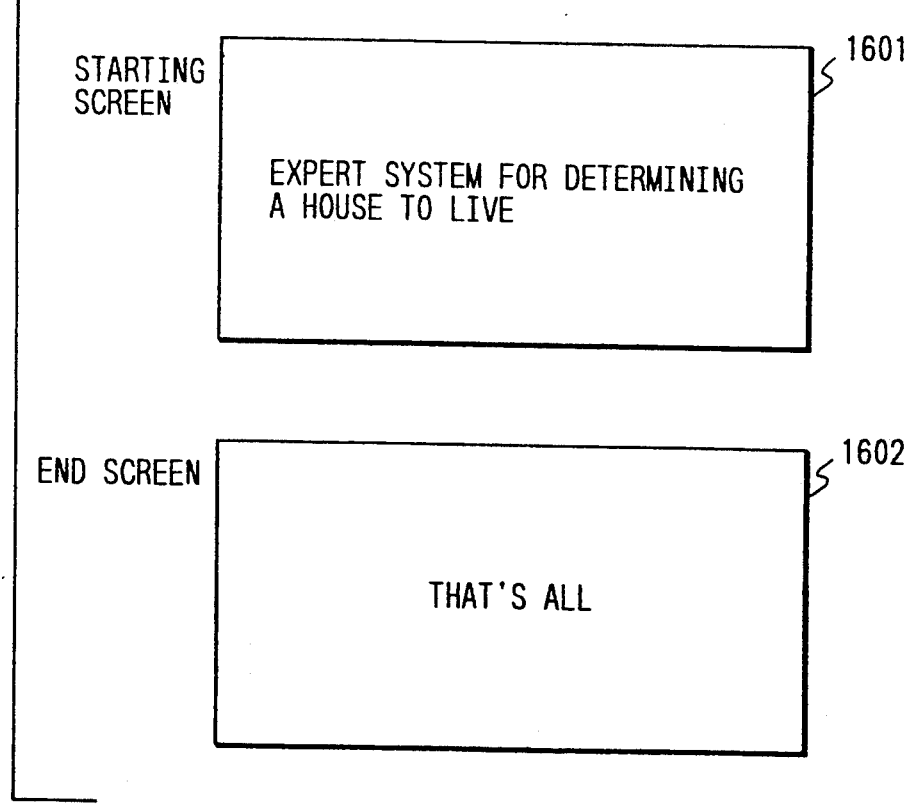
FIG. 16 shows the starting image and the end image.

In turn, the following describes additions of a starting image and an end image to the expert system. FIG. 15 shows a decision tree 1501 which represents a whole flow of operation of the expert system including the starting image and the end image. FIG. 16 shows the starting image 1601 and the end image 1602. A node 'Start' 1502 of the decision tree 1501 specifies for appearance of the starting image 1601. The node 'End' 1504 specifies for appearance of the end image 1602. With input of them, the expert system 204 generated by the converter 304 can first display the starting image 1601, then the menu for determining a house to live, and finally the end image 1602. The example contains only one stage in which the node includes the decision tree, but it can contain a plurality of hierarchized stages.

As described so far, the inventors could build the expert system for diagnosing the house for a person to live in.

(2) Internal processes of the generated expert system

In turn, the following is an internal configuration of the expert system generated by the expert system building tool described in subsection (1) above. It begins with an outline of the internal configuration and is followed with its details with use of flow charts.

Figure 1:
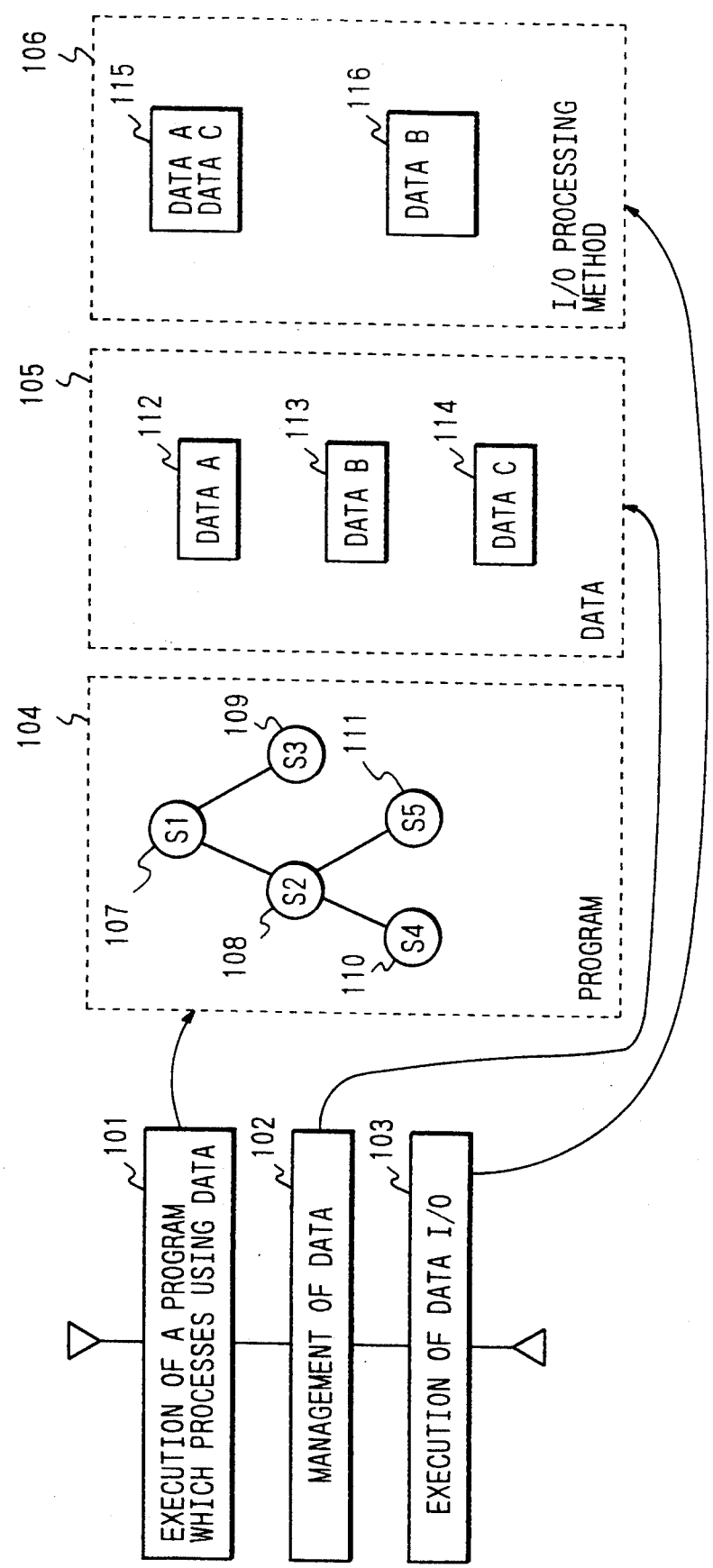
FIG. 1 is an outline for processing by the expert system.

FIG. 1 is an outline for processing by the expert system. It includes a program 104, a data section 105, an I/O processing method 106, a step 101, a step 102, and a step 103. The program 104 comprises nodes 107 through 111. The section 105 and the I/O processing method 106 have specific data 112 through 114 and specific I/O processing methods 115 and 116, respectively. The step 101 can execute the program 104. The step 102 can control the specific data section 105. The step 103 can execute input or output with use of the specific input processing methods data 105 and 106 of the I/O processing method 106.

The following describes the process in detail. The following example uses a decision tree for the program 104 which is described in an object oriented manner. In this way, a process step and data are treated as one object. FIG. 1 is made to correspond to FIG. 17 as necessary in the following description.

Figure 17:
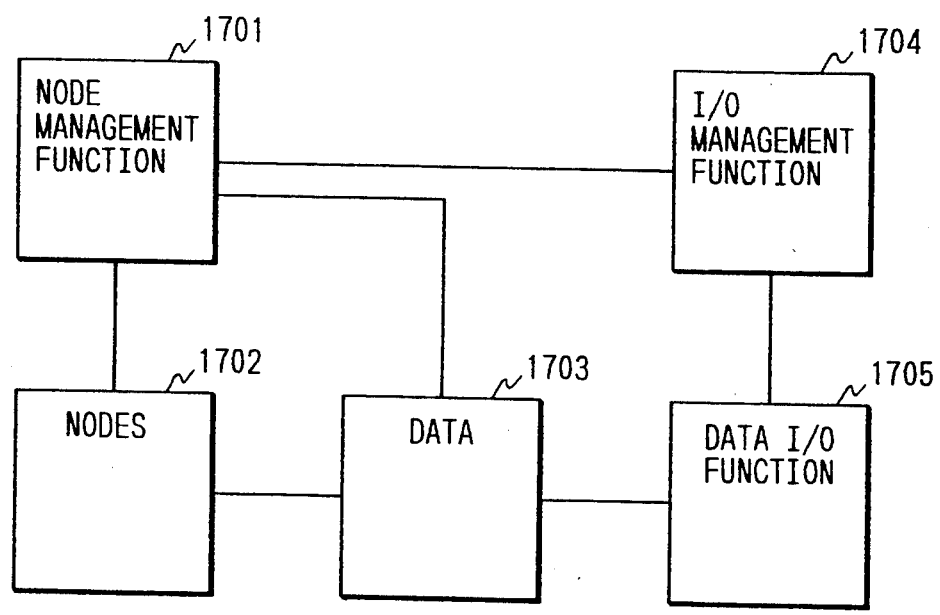
FIG. 17 is an internal configuration of the expert system.

FIG. 17 is an internal configuration of the expert system. Each section of it is an object which is executed by message passing. A node group 1702, which correspond to the program 104, includes nodes, which correspond to the nodes 107 through 111. Each of them can judge data, which correspond to the step 102 and the specific data 112 through 114, of a data group 1703, which corresponds to the data section 105, if any. A judgement result is sent to a node management function section 1701, which corresponds to the step 101. Depending on the result, the node management function section 1701 judges a node to which a process is moved. If a value is already entered in the node when reference to the value is needed, the data of the data group 1703 is made nothing. If no value is entered, it is requested that corresponding data of the data I/O functions, which correspond to the step 103 and the specific I/O methods 115 and 116, existing in the data I/O function group 1705, which corresponds to the I/O processing method 106 be entered. The data I/O function group 1705 can input or output the data through a display or the like. The entered data value is sent to the data group 1703. The I/O management function section 1704 can control data input to or output from the display. If the data is entered to correct a preceding data value, the data of the data group 1703 learns at what node its data is used, and apprises the node management function section 1701 that it should return control of inference to the node. Depending on it, the node management function section 1701 controls transition of the node.

In turn, the following describes the processes in details with use of the flow charts. Each process is made as the object as described previously. Every method will be described below with use of the flow chart. It should be noted that message transmission is referred to as the "request of message" or the "sending of message" in the flow chart.

Figure 18:
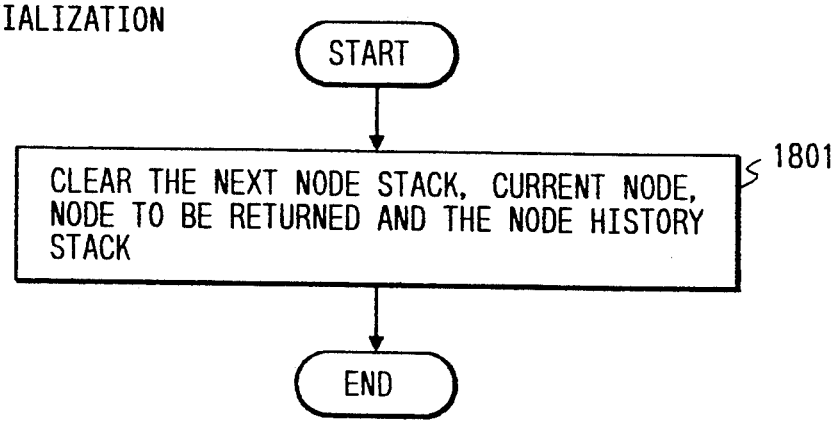
FIGS. 18 through 36 are flow charts illustrating operation of the present invention.

First, the process of the node management function section 1701 will be described below. FIG. 18 is flow chart for initialization. This method is used for initialization. A step 1801 clears various working areas.

Figure 19:
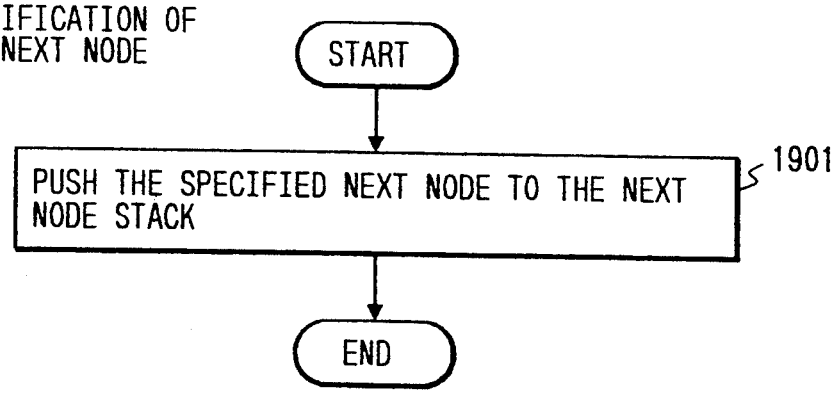

FIG. 19 is a flow chart for a specification of the next node. This method is used when a node in the node group 1702 makes judgement process of the next node, and its result is transmitted. A step 1901 pushes the specified next node to the next node stack.

Figure 20:
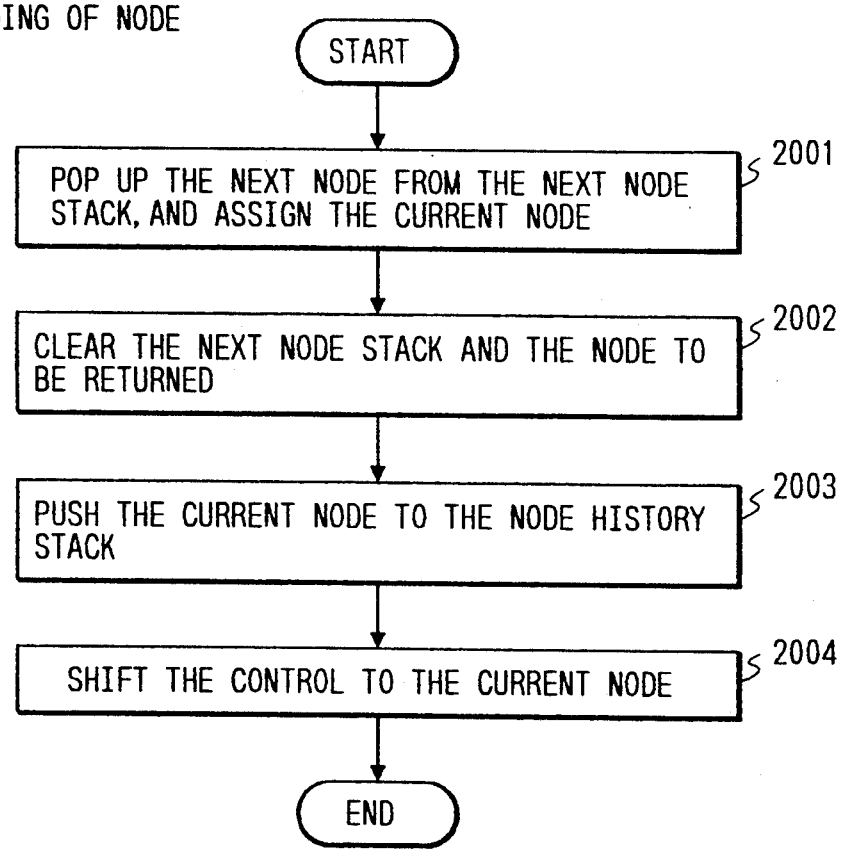

FIG. 20 is a flow chart for ending of node. The method is used when a node in the node group 1702 ends the process. First, the next node is popped up from the next node stack and is assigned to the current node (step 2001). The next node stack and the node to be returned are cleared (step 2002). The current node is pushed to the node history stack (step 2003). The control is shifted to the current node. When the process for the node is as described above, the control is moved to the next node depending on the result of the judgement process of the node.

Figure 21:
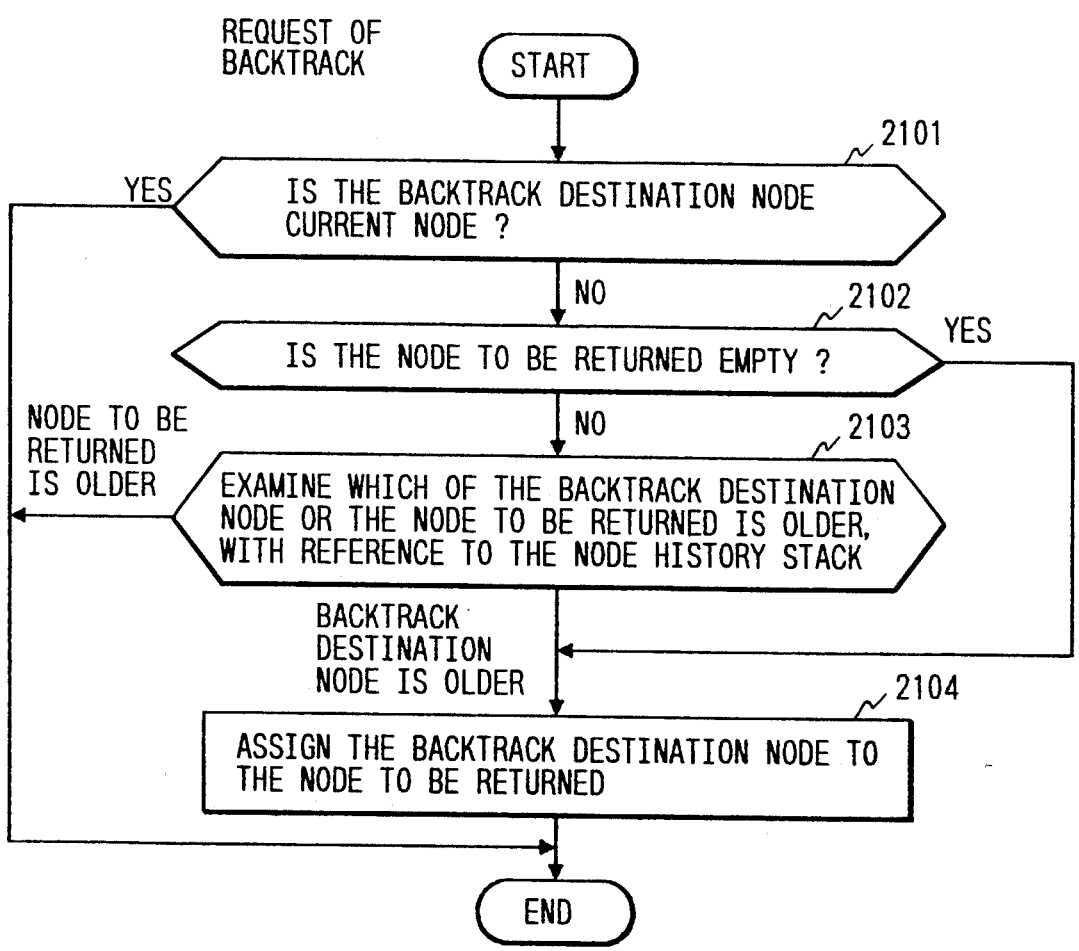

FIG. 21 is a flow chart for request of a back track. This method is used when the data entered once is corrected later to return to the process of the node used for the data. First, a backtrack destination node is compared with the current node. If they are identical, no process is made (step 2101). If not, the node to be returned is compared with empty (step 2102). If it is not empty, a node history stack is referred to examine which of the backtrack destination node or the node to be returned is older (step 2103). If the node to be returned is older, no process is made. If the backtrack destination node is older or if the node to be returned at the preceding step 2101 is empty, the backtrack destination node is assigned to the node to be returned. (step 2104). The reason why the node to be returned is replaced is that returning is made to the oldest one of the nodes having used the data when a plurality of the data are corrected at a time.

Figure 22:
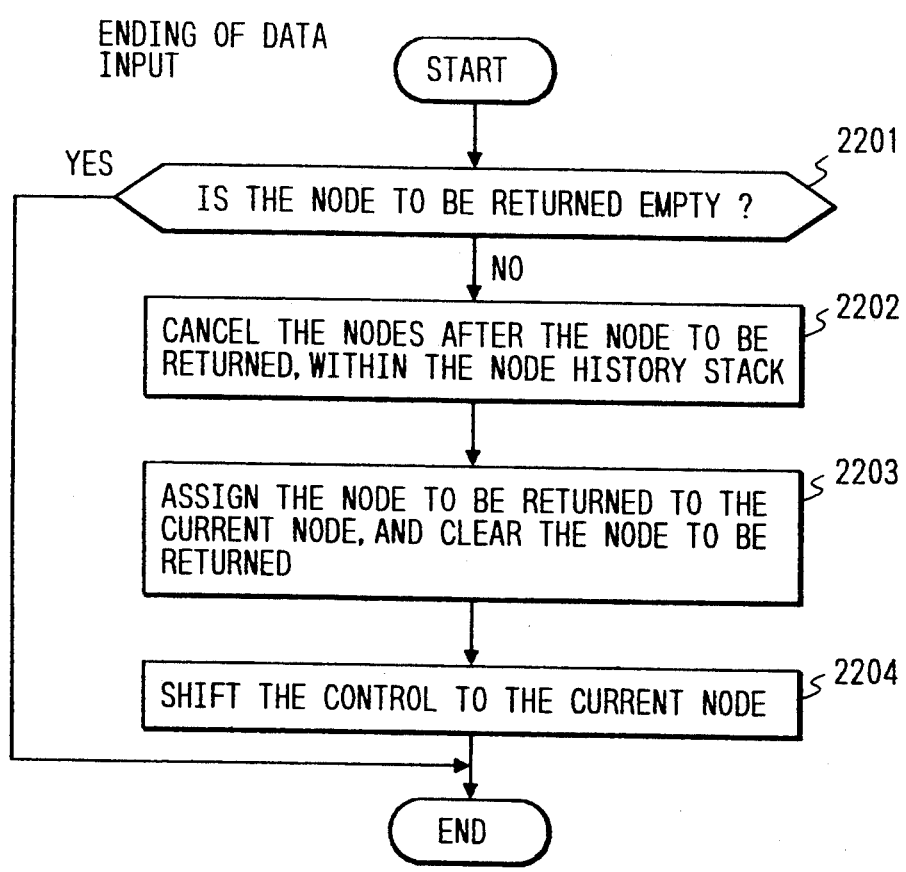

FIG. 22 is a flow chart for ending of data input. This method is used when the data input by the end user ends. The backtrack process is made as necessary. First, if the node to be returned is empty, no process is made (step 2201). If not, nodes after the node to be returned, within the node history stack, are canceled (step 2202). The node to be returned is assigned to the current node, and the node to be returned is cleared (step 2203). The control is moved to the current node (step 2204).

Figure 23:
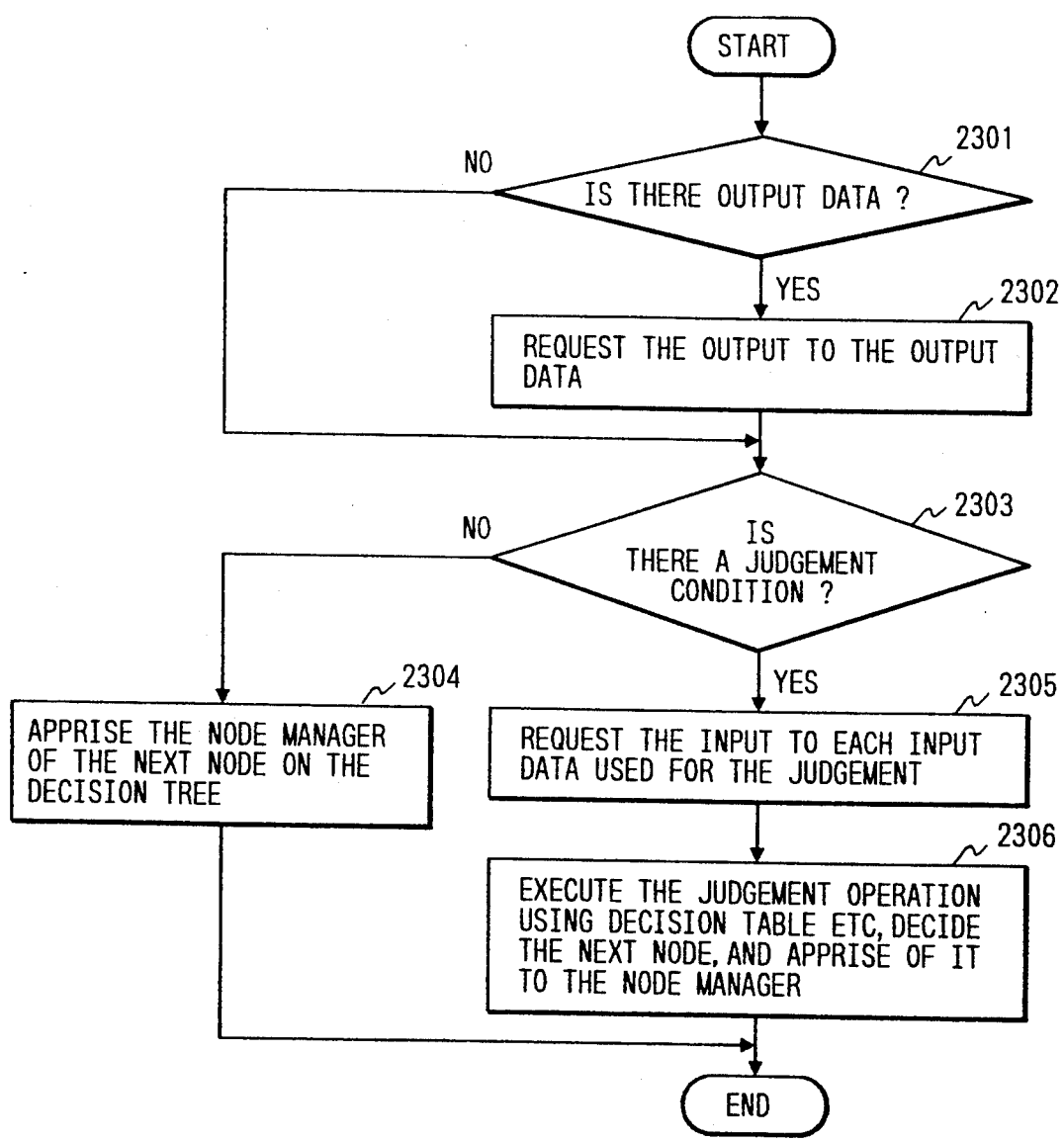

The following describes the nodes of the node group 1702. FIG. 23 is a flow chart illustrating an outline of execution of node. First, there is output data (step 2301), the output data is requested to output (step 2302). If there is no judgement condition (step 2303), a node manager is apprised of the next node on the decision tree (step 2304). If there is a judgement condition, each of the input data used for the judgement is requested to input (step 2305). The judgement process is made to decide the next node and to apprise the node manager (step 2306). The case that no judgement condition is at step 2303 is a case like the decision tree 1501 shown in FIG. 15. The next node on the decision tree at step 2304, is the node 'Diagnose' 1503 for the node 'Start' 1502. If the node contains another decision tree as in the node 'Diagnose' 1503, a process similar to the one described above is made.

Figure 24:
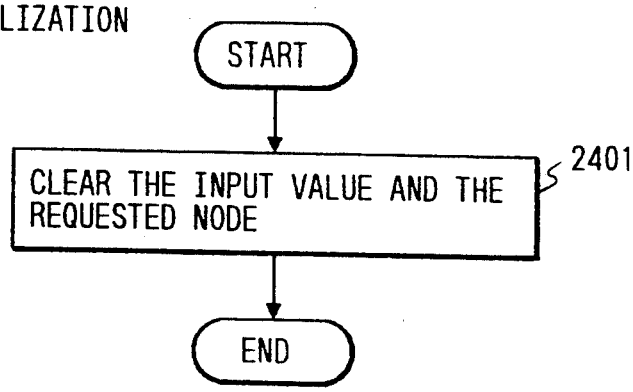

In turn, the following describes the data of the data group 1703, particularly the input data. FIG. 24 is a flow chart for initialization. This method is used for initialization. A step 2401 clears the input value and requested node.

Figure 25:
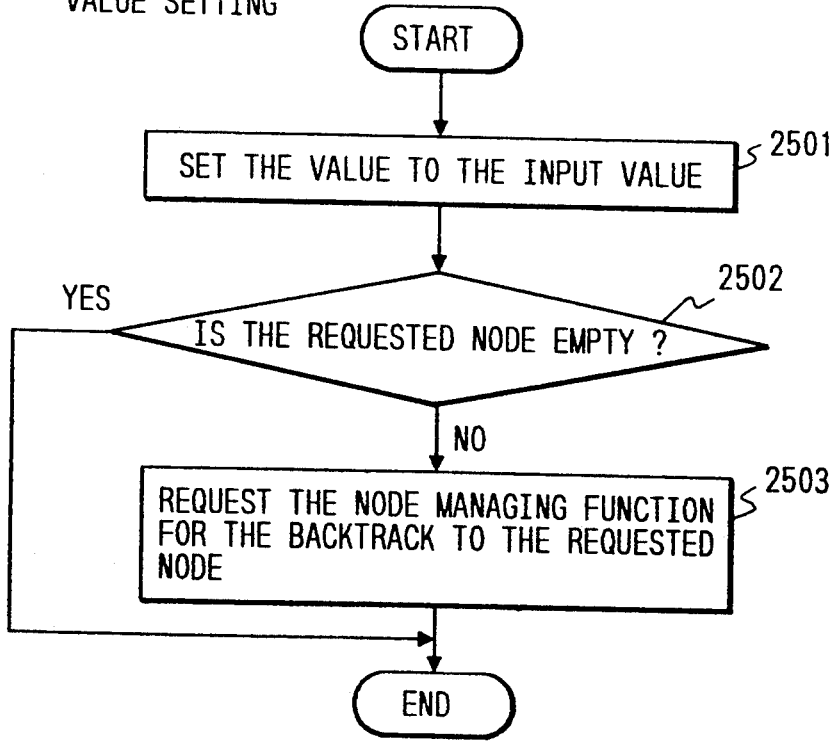

FIG. 25 is a flow chart for setting the value. This method is used to store the input value if the end user enters or corrects the data. If the data is corrected, backtrack is requested up to the node having used the data. First, the value is set to the input value (step 2501). If the requested node is empty, no process is made afterward (step 2502). If not, the node management function section is requested that backtrack should be made to the requested node (step 2503).

Figure 26:
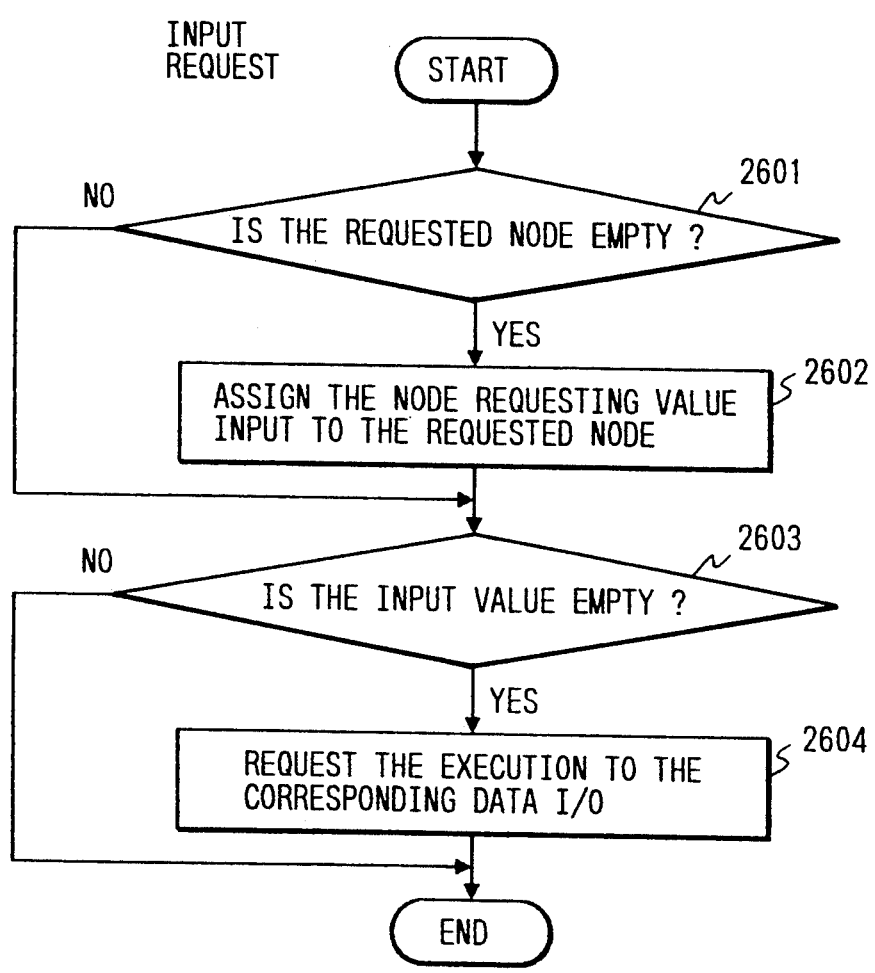

FIG. 26 is a flow chart for an input request. This method is used for maintaining the data needed for a judgement process and the like. First, if the requested node is empty (step 2601), the node having requested value input is assigned to the requested node (step 2602). If the input value is empty (step 2603), execution is requested to the corresponding data I/O (step 2604). If output is requested to the output data, execution is requested to the corresponding data I/O.

Figure 27:
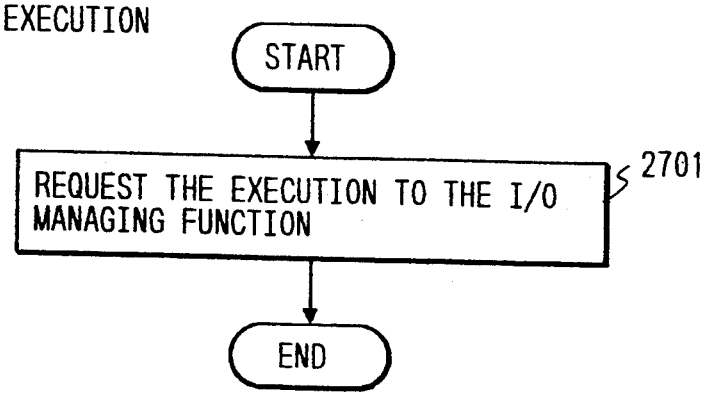

In turn, the following describes data I/O in the data I/O function group 1705. FIG. 27 is a flow chart for execution. This method is used when data is input or output from the data in the data group 1703. A step 2701 requests execution to the I/O management function section 1704. After this, the I/O management function section 1704 will allow display of a menu depending on the state of the current menu.

Figure 28:
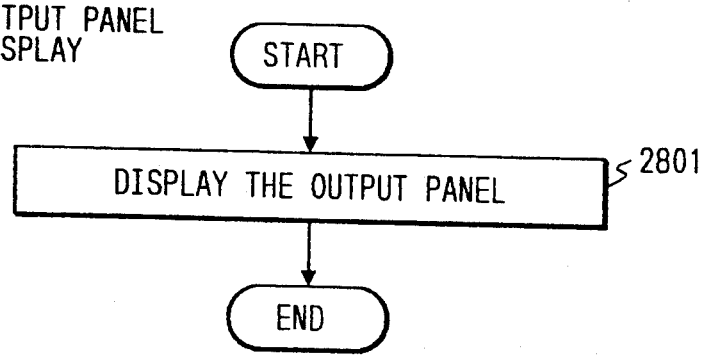
Figure 29:
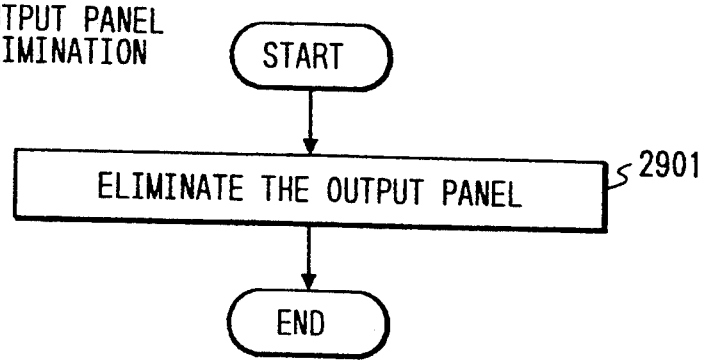

FIGS. 28 and 29 are flow charts for displaying the output panel and eliminating it, respectively. A step 2801 displays the output panel. A step 2901 eliminates the output panel.

Figure 30:
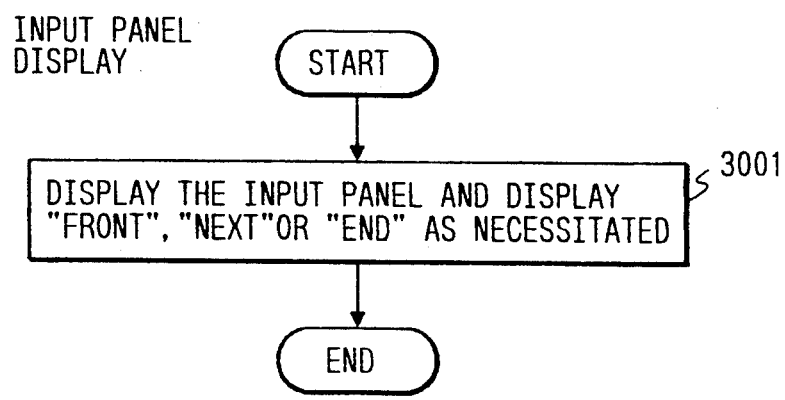
Figure 31:
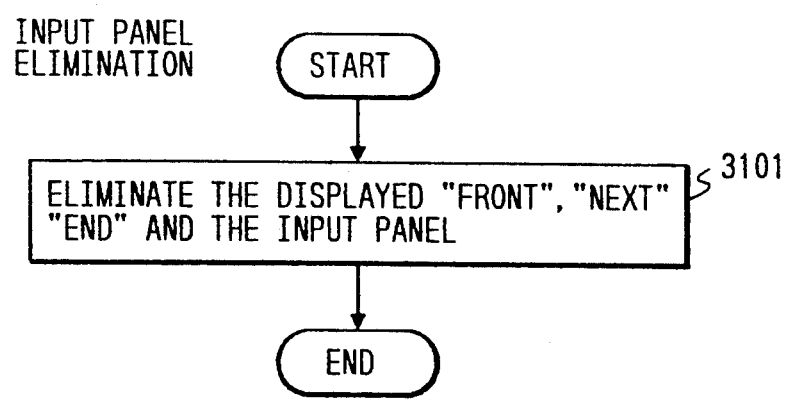

FIGS. 30 and 31 are flow charts for displaying the input panel and eliminating it, respectively. A step 3001 displays the input panel, 'Front', 'Next', and 'End'. A step 3101 eliminates the input panel, 'Front', 'Next', and 'End'.

Figure 32:
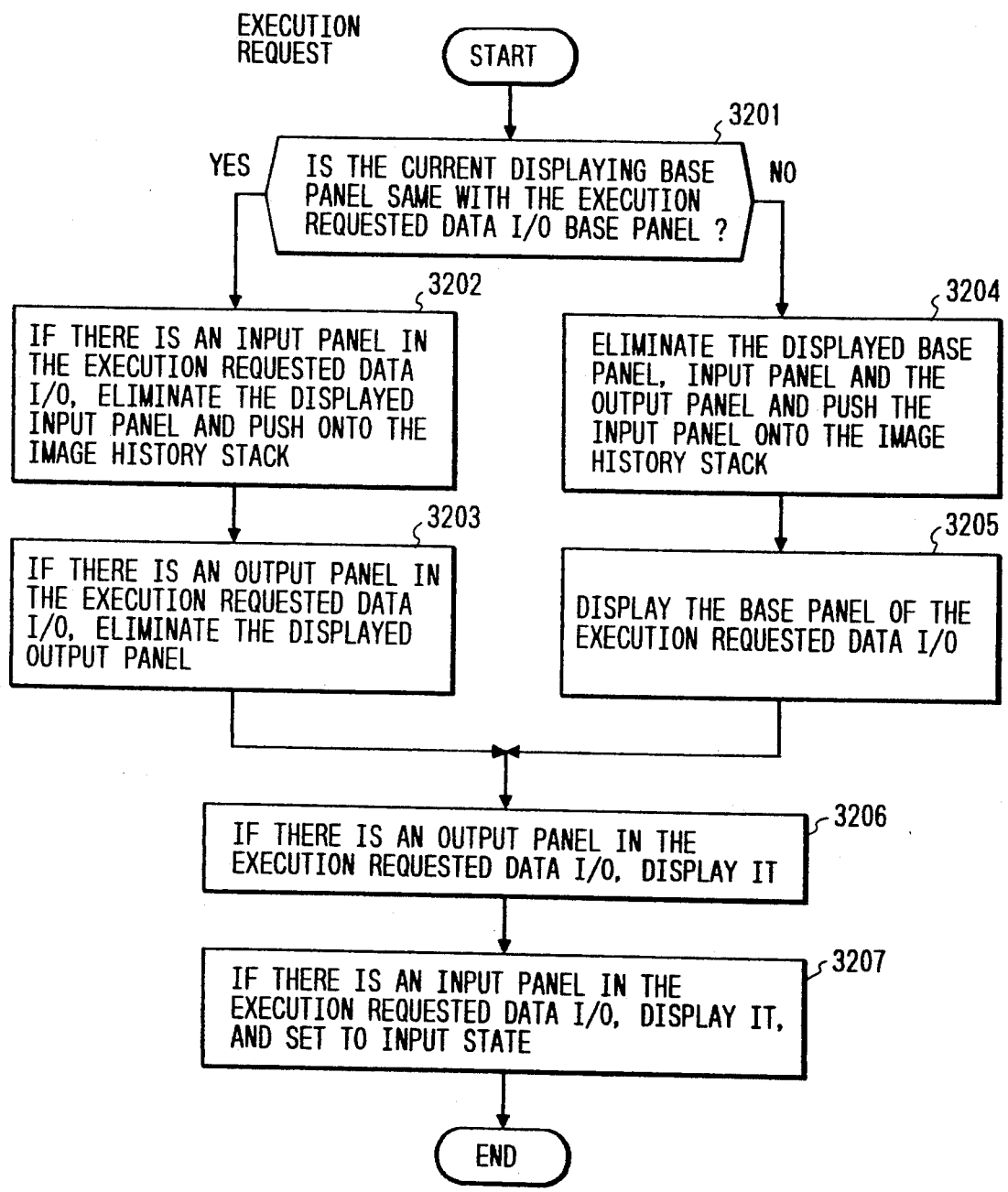

In turn, the following describes the I/O management function section 1704. FIG. 32 is a flow chart for an execution request. If the execution request is made by data I/O of the data I/O function group 1705, it is compared with the current menu. The menu is updated with the least procedures. If there is the data input panel, it is made a data input state. First, if the base panel displayed currently is identical with the one for the data I/O (step 3201), and if the data I/O having requested the execution has the input panel, the input panel being displayed is eliminated and pushed on to the image history stack (step 3202). Further, if the data I/O having requested the execution has the output panel, the output panel being displayed is eliminated (step 3203). If it is not identical in step 3201, the displayed base panel, the input panel, and the output panel are eliminated, and the input panel is pushed onto the image history stack (step 3204), and the base panel for the data I/O having requested the execution is displayed (3205). Furthermore, in either case by judgement of step 3201, if the output panel is in the data I/O having requested the execution, it is displayed (step 3206), and if the input panel is in the data I/O having requested the execution, it is displayed and made an input state (step 3207).

Figure 33:
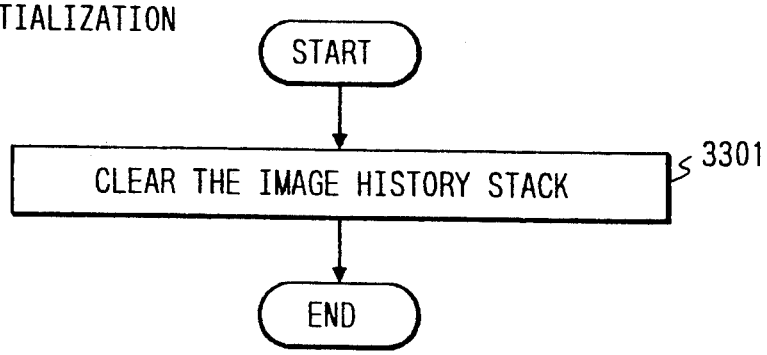

FIG. 33 is a flow chart for initialization. This method is used for initialization first. A step 3301 clears the image history stack.

Figure 34:
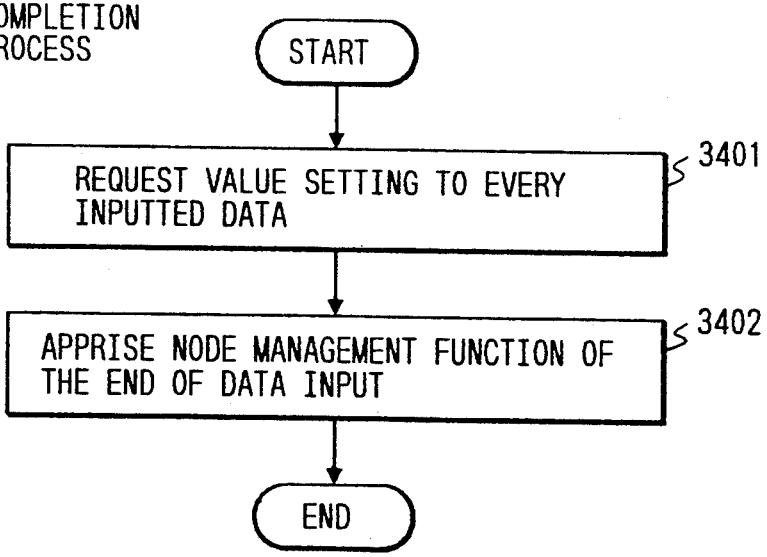

In turn, the following describes operation at the time of input, particularly inputs other than the input of data. FIG. 34 is a flow chart for end process. This procedure is used when the data is being input, when input is made of a value corresponding to the data of the data group 1703 having requested execution of the data I/O of the data I/O function group 1705 which is making input or output at least, and when the icon of 'End' is specified. First, value setting is requested to all the input data (step 3401). The node management function section 1701 is apprised of the end of data input (step 3402).

Figure 35:
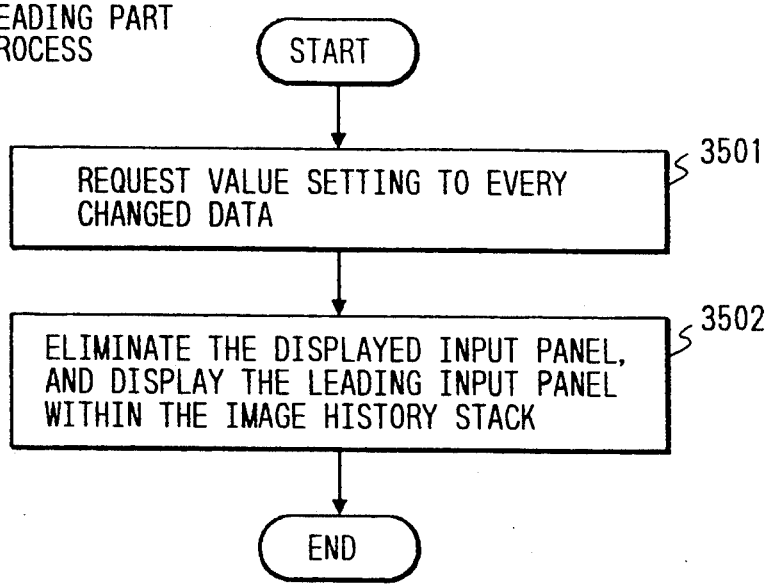

FIG. 35 is a flow chart for leading part process. This procedure is used when data is being input and when the icon of 'Front' is specified. First, value setting is requested to all the updated data (step 3501). The input panel being displayed is eliminated, and the leading input panel within the image history stack is displayed (step 3502).

Figure 36:
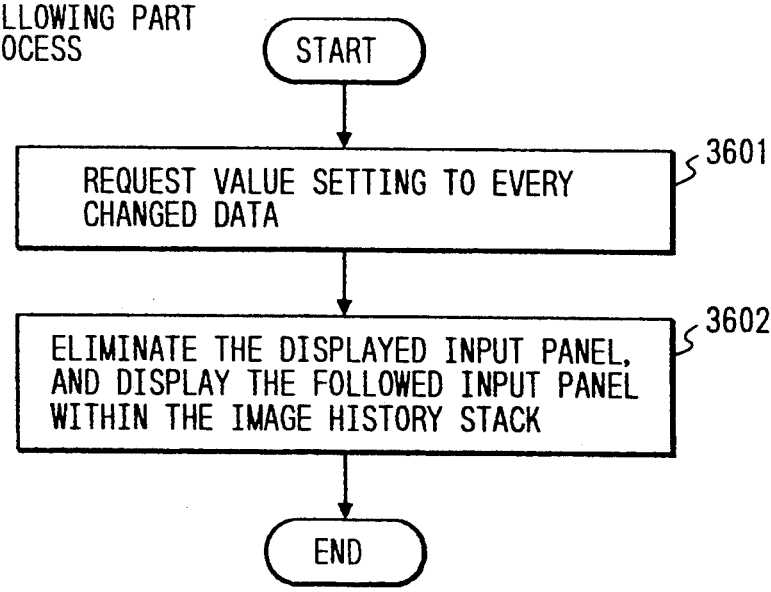

FIG. 36 is a flow chart for following part process. This procedure is used when data is being input and when the icon of 'Next' is specified. First, value setting is requested to all the updated data (step 3601). The input panel being displayed is eliminated, and the following input panel within the image history stack is displayed (step 3602).

The expert system generated by the expert system building tool described in the embodiment can be operated in the way of process described so far. As it comprises the separate functions, it can be easily corrected for each function and extended.

(3) A method for generating the expert system

Finally, the following describes how in the expert system building tool described in subsection (1) previously, the converter 304 can generate the expert system with the data entered by the tree editor 301 and the I/O definition editor 302. The internal configuration of the expert system, as described in subsection (2), are made to correspond to the data entered by the tree editor 301 and the I/O definition editor 302. For the reason, the expert system to be generated should correspond to the entered data.

As described in subsection (2), the expert system according to the present invention can make inference according to the logic of inference (the program for processing with use of data) having the expert's know-hows described therein as they are while the data is entered according to the I/O methods which are easy to understand for the end user.

What is claimed is:

1. In an expert system having storing means, and means for operating a program having at least a decision tree comprising a plurality of nodes, a node deciding method comprising:
   a step of reading a group of data from said storing means, said group of data being in common to at least one of said nodes, and having input/output method information of the data of said group, and the data of said group including a plurality of data units which includes a plurality of data names, and said reading of a group of data being based upon a data name and a value of a data unit in said group of data; and
   a step of selecting a next node on said decision tree, on the basis of at least one data unit in at least one group of data.

2. A node deciding method according to claim 1, further comprising:
   a step of writing said value of the data unit, in the course of operating said program, if the storing means has no corresponding value of the data unit.

3. A node deciding method according to claim 2, wherein an image displayed on a screen at a time of data input is specified as said input/output method information.

4. A node deciding method according to claim 3, wherein the image has a background image and an image having an input column for data to indicate parts of the image.

5. A node deciding method according to claim 2, wherein the data input/output method information specifies a medium for said writing.

6. A node deciding method according to claim 2, wherein the selection made by said selecting step is based upon said value of the data unit.

7. A node deciding method according to claim 2, wherein the decision made by said selecting step is based upon a total score of scores for each data unit used, each of said scores being made in terms of the value of each of the data units.

8. A node deciding method according to claim 1, further comprising:
   a step of storing a position in the program using one of the data units of the plurality if in the course of operating the program, the position has not been stored yet.

9. A node deciding method according to claim 8, wherein when an entered data unit of the plurality is corrected, a position corresponding to the corrected entered data unit, in said decision tree is passed to said program if the position corresponding to the corrected entered data unit is stored.

10. A node deciding method according to claim 1, wherein at least either of input or output is executed with use of a predetermined input/output method for default, if no data input/output method information is specified in the group of data read in said reading step.

11. A node deciding method according to claim 1 wherein said group of data in said step of reading is in common to a plurality of said nodes.

12. A node deciding method according to claim 1, further comprising:
   a step of displaying information with respect to the selected next node.

* * * * *